United States Patent [19]
Gove et al.

[11] Patent Number: 5,499,060
[45] Date of Patent: Mar. 12, 1996

[54] SYSTEM AND METHOD FOR PROCESSING VIDEO DATA

[75] Inventors: Robert J. Gove; Richard C. Meyer, both of Plano; Vishal Markandey, Dallas, all of Tex.

[73] Assignee: Texas Instruments Incorporated, Dallas, Tex.

[21] Appl. No.: 177,013

[22] Filed: Jan. 4, 1994

[51] Int. Cl.$^6$ .................................. H04N 9/64
[52] U.S. Cl. .................... 348/651; 348/571; 348/721
[58] Field of Search ..................... 348/651, 571, 348/720, 721, 639, 663, 659, 660, 572, 418, 419, 420, 422; H04N 9/64, 9/66

[56] References Cited

U.S. PATENT DOCUMENTS

| | | | |
|---|---|---|---|
| 4,580,134 | 4/1986 | Campbell et al. | 348/420 |
| 4,672,424 | 6/1987 | Lechner | 348/472 |
| 4,674,064 | 6/1987 | Vaughn | 395/500 |
| 5,053,864 | 10/1991 | Thompson | 348/717 |
| 5,202,756 | 4/1993 | Sasaki et al. | 348/659 |
| 5,283,646 | 2/1994 | Bruder | 348/420 |
| 5,347,321 | 9/1994 | Gove | 348/663 |

*Primary Examiner*—James J. Groody
*Assistant Examiner*—Chris Grant
*Attorney, Agent, or Firm*—Julie L. Reed; Richard L. Donaldson; René E. Grossman

[57] ABSTRACT

A system ($14^1$) for processing pixel video data having a selectable number of bits is provided. The system ($14^1$) comprises first, second and third video processors (20), (22) and (24). The first video processor (20) receives and processes pixel data of a luminance video signal. The second video processor (22) may receive and process pixel data of a chrominance video signal and may generate one of first, second and third video signal outputs. The third video processor (24) may process the chrominance video signal and may also generate at least two of the output video signals.

19 Claims, 1 Drawing Sheet

1

SYSTEM AND METHOD FOR PROCESSING VIDEO DATA

TECHNICAL FIELD OF THE INVENTION

This invention relates in general to the field of electronic devices. More particularly, this invention relates to a system and method for processing video data.

BACKGROUND OF THE INVENTION

In a standard television system, a video picture is broadcast and displayed using analog video signals. Recently, the electronics industry has begun to replace many existing analog systems with new digital systems. To a limited extent, the trend towards digitization of electronic systems has moved into the television arena.

One problem encountered using digital video signals in a television environment is the generation of "artifacts" in the display of digital video signals. For example, a diagonal line in a digital video display may appear as a staircase. Heretofore known digital television systems have used pixel data comprising, for example, at most eight bits of video data per pixel. Additionally, heretofore known digital television systems perform very little, if any, processing of the video signal to compensate for the generation of artifacts.

SUMMARY OF THE INVENTION

In accordance with the present invention, a system and method for processing video data is provided which substantially eliminates or reduces disadvantages and problems associated with heretofore known systems and methods. More specifically, one embodiment of the present invention provides a system for processing pixel data wherein each pixel has a selectable number of bits. The system comprises three video processors. The first video processor receives and processes pixel data for a luminance video signal. The second video processor may receive and process pixel data of a chrominance video signal and may generate one of a first, second and third video signal outputs. The third video processor may process the chrominance video signal and may also generate at least two of the first, second and third video signal outputs.

It is a technical advantage of the present invention to use a single architecture to process video data having a selectable number of bits per pixel. The system may vary the processing of video data in accordance with the number of bits per pixel. For example, the system may decrease the amount of processing of the video data as the number of bits per pixel increases.

It is another technical advantage of the present invention that the system provides a digital video signal that minimizes the affect of artifacts created upon creating a digital video signal. The system uses a high dynamic range for the video signal being processed. The high dynamic range results in more shades for each video signal so that images such as diagonal lines do not appear as staircases.

BRIEF DESCRIPTION OF THE DRAWINGS

For a more complete understanding of the present invention and the advantages thereof, reference is now made to the following description taken in conjunction with the accompanying drawing in which like reference numerals indicate like features and wherein.

DETAILED DESCRIPTION OF THE INVENTION

A comprehensive description of a DMD-based digital display system is set out in U.S. Pat. No. 5,079,544, entitled "Standard Independent Digitized Video System", and in U.S. patent Ser. No. 08/147,249, entitled "Digital Television System", and in U.S. patent Ser. No. 08/146,385 entitled "DMD Display System", each assigned to Texas Instruments Incorporated, and each incorporated by reference herein.

U.S. patent Ser. No. 07/678,761, entitled "DMD Architecture and Timing for Use in a Pulse-Width Modulated Display System", describes a method a formatting video data for use with a DMD-based display system and a method of modulating bit-planes of data to provide varying pixel brightness. The general use of a DMD-based display system with a color wheel to provide sequential color images is described in U.S. patent Ser. No. 07/809,816, entitled "White Light Enhanced Color Field Sequential Projection". These patent applications are assigned to Texas Instruments Incorporated, and are incorporated herein by reference.

Figure 1:
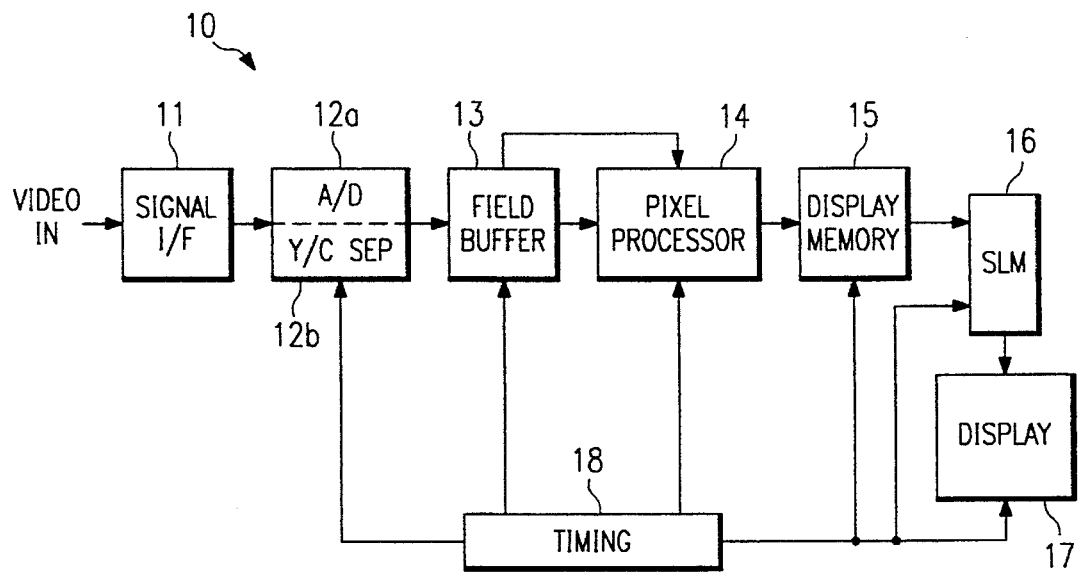
FIG. 1 is a block diagram of a color display system having a system for processing video data constructed according to the teachings of the present invention.

FIG. 1 is a block diagram of an SLM-based display system 10, which receives an analog video signal, such as a broadcast television signal. Display system 10 could be any type of equipment for receiving an analog composite video signal and displaying images represented by the signal. In FIG. 1, only those components significant to main-screen pixel data processing are shown. Other components, such as might be used for processing synchronization and audio signals or secondary screen features, such as closed captioning, are not shown.

A display frame having 640 pixels per row, 480 rows per frame, and 3*N bits per pixel, sampled from an NTSC signal, is assumed. This is after a line generation process is performed by processing system 14, to convert interlaced fields having 240 odd-rows or 240 even-rows of data into display frames having 480 rows. Interlaced video fields come in two components. A first field has either the odd- or even-numbered lines of the field. A second field has those lines that the first field does not. They are normally combined at the point of display, not before. Proscan conversion takes these two fields, typically 240 lines each and combines them together, forming one 480-line field of video data before the frame is stored. Proscan can be performed by any of the processors in system 14. There are N bits of data per pixel of each of three colors. It is also assumed that the input signal is a "component" signal, having a luminance component and a color difference component, or some signal other than an RGB signal.

As an overview of the operation of display system 10, signal interface unit 11 receives an analog video signal and separates video, synchronization, and audio signals. It delivers the video signal to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

A field buffer 13 is interposed between Y/C separator 12b and pixel processor 14. This field buffer 13 is useful for field spreading. Because the SLM-based system 10 does not require vertical blanking time, the extra time between fields may be used to increase the time available for processing data and for loading data to SLM 16. Field buffer 13 may have other functions related to line generation, color wheel synchronization, and scaling.

Pixel processor 14 prepares the data for display, by performing various pixel data processing tasks. Pixel processor 14 includes a processing memory for storing pixel data during processing. Pixel processor 14 may perform tasks including colorspace conversion, proscan, and vertical scaling as described in co-pending U.S. application Ser. No. 08/147,249.

Display memory 15 receives processed pixel data from pixel processor 14. Display memory 15 formats the data, on input or on output, into "bit-plane" format as described in co-pending U.S. application Ser. No. 08/147,249, and delivers the bit-planes to memory cells of SLM 16. The bit-plane format permits each pixel element of SLM 16 to be turned on or off in response to the value of each bit of data. In a typical display system 10, display memory 15 is a "double buffer" memory, which means that it has a capacity for at least two display frames. The buffer for one display frame can be read out to SLM 16 while the buffer another display frame is being written. The two buffers are controlled in a "ping-pong" manner so that data is continuously available to SLM 16.

SLM 16 may be any type of SLM. Although this description is in terms of a DMD-type of SLM 16, other types of SLMs could be substituted into display system 10 and used for the invention described herein. For example, SLM 16 could be an LCD-type SLM having addressable pixel elements. Details of a suitable SLM 16 are set out in U.S. Pat. No. 4,956,619, entitled "Spatial Light Modulator", which is assigned to Texas Instruments Incorporated, and incorporated by reference herein.

Display unit 17 has optical components for receiving the image from SLM 16 and for illuminating an image plane such as a display screen. For color displays, the bit-planes for each color could be sequenced and synchronized to a color wheel that is part of display unit 17. Or, the data for different colors could be concurrently displayed on three SLMs and combined by display unit 17. Timing unit 18 provides various system control functions.

Figure 2:
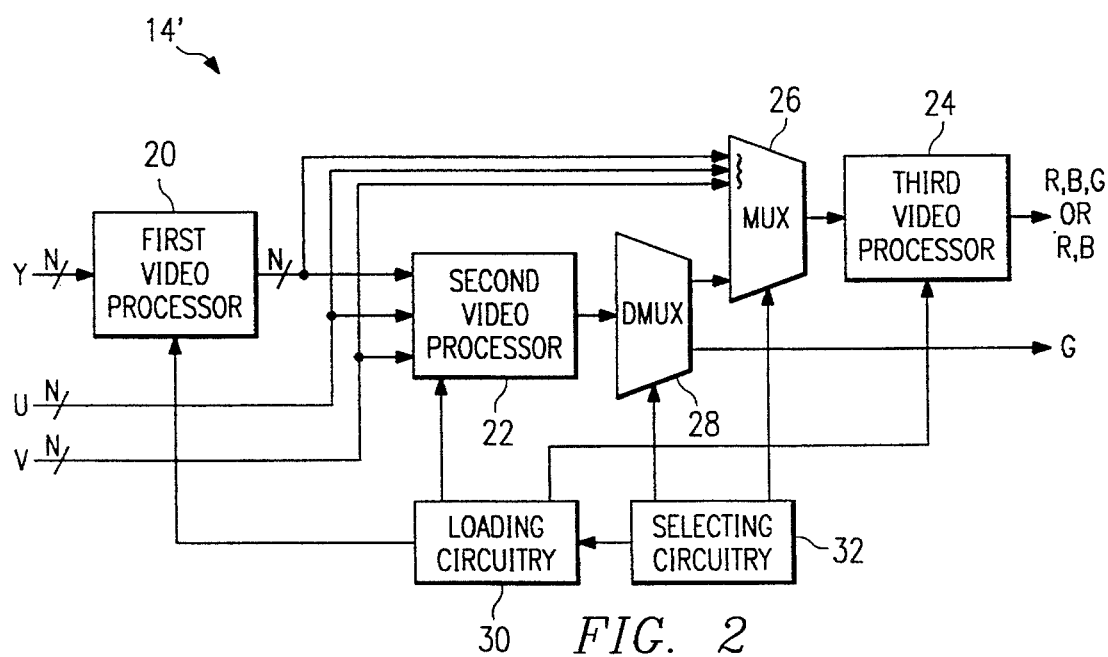
FIG. 2 illustrates an embodiment of the system for processing video data of FIG. 1 constructed according to the teachings of the present invention.

FIG. 2 illustrates a system for processing video data indicated generally at 14' and constructed according to the teachings of the present invention. Video data processing system 14' comprises one embodiment of pixel processor 14 of FIG. 1. System 14' is a programmable system that accepts input video signals having a selectable number of bits. For example, the input video signals of system 14' may comprise 8 bits per pixel. Alternatively, the input video signals of system 14' may comprise 10, 12, 14 or another appropriate number of bits per pixel. The number of bits per pixel may be referred to as the dynamic range of system 14'. A system 14' with a high dynamic range may produce a better quality video output. System 14' comprises a single architecture capable of processing input video signals of a selectable member of bits.

System 14' comprises first, second and third video processors 20, 22, and 24, respectively, multiplexer 26, demultiplexer 28, loading circuitry 30, and selecting circuitry 32. Video processors 20, 22 and 24 may comprise, for example, scan-line video processors produced by TEXAS INSTRUMENTS INCORPORATED. Alternatively, video processors 20, 22 and 24 may comprise other appropriate video processors for processing input pixel video data. System 14' receives a luminance, Y, video signal at first video processor 20. Additionally, system 14' receives appropriate chrominance video signals, such as U and V video signals, at second video processor 22. Alternately, system 14' may operate on other appropriate video signals such as Y, I and Q, or R, B and G.

System 14' functions to process and convert the input video signals to produce appropriate output video signals. For example, the output video signals may comprise red, blue and green video signals. Each of the Y, U and V input video signals may comprise a selectable number of bits, N.

First video processor 20 may process the input Y video signal. For example, first video processor 20 may perform motion detection, sharpness, proscan, and vertical filtering and other appropriate functions as described in co-pending U.S. patent application Ser. No. 08/147,249. Alternatively, first video processor 20 may perform other appropriate processing. The output of first video processor 20 is coupled to second video processor 22. Additionally, the output of first video processor 20 and the U and V input video signals are coupled to a first input of multiplexer 26. The output of multiplexer 26 is coupled to third video processor 24. Thereby, the output of first video processor 20 may be further processed in either second or third video processors 22 and 24.

Second video processor 22 may perform the proscan function on the U and V input video signals. Additionally, second video processor 22 may, for example, perform one of two other functions. First, second video processor 22 may perform further processing of the input Y video signal. For example, second video processor 22 may perform cubic scaling of the input Y video signal as described in co-pending U.S. patent application Ser. No. 08/147,249. As an alternative function, second video processor 22 may generate one of three output video signals. For example, second video processor may generate one of the red, blue, or green output video signals by performing a color space conversion function as described in co-pending U.S. patent application Ser. No. 08/147,249.

The output of second video processor 22 is coupled to the input of demultiplexer 28. A first output of demultiplexer 28 is coupled to a second input of multiplexer 26. A second output of demultiplexer 28 provides an output of system 14'. Demultiplexer 28 passes the output of second video processor 22 to third video processor 24 if second video processor 22 performs additional processing of the Y video signal. Alternatively, demultiplexer 28 provides the output of second video processor 22 as an output of system 14' if second video processor 22 performs, for example, a color space conversion.

Third video processor 24 may, for example, perform one of two functions. First, third video processor 24 may function to convert a video signal from second video processor 22 into first, second and third output video signals. For example, third video processor may use the color space conversion function to convert the processed Y, U, and V video signals into red, blue and green video signals. Alternatively, third video processor 24 may function to process input video signals U and V and generate two of the output signals of system 14'. For example, third video processor 24 may perform the proscan function on the input U and V video signals. Additionally, third video processor 24 may produce two of the red, blue, or green video signals by implementing the color space conversion function.

Loading circuitry 30 may provide appropriate functions to video processors 20, 22, and 24. The functions provided by loading circuitry 20 may be controlled by selecting circuitry 32. Selecting circuitry 32 supplies system 14' with the number of bits per pixel of the input video signals. Additionally, selecting circuitry 32 may be coupled to multiplexer 26 and demultiplexer 28 to provide appropriate video signals to third processor 24.

System 14' may be further operable to scale the number of bits per pixel. For example, the input video signals may comprise 8 bits. System 14' may use an appropriate function to scale the number of bits per pixel to 10, 12, 14 or another appropriate number of bits.

In operation, system 14' processes input video signals having a selectable number of bits. The number of bits per pixel of the input video signals is selected by selecting circuitry 32. Loading circuitry 30 loads appropriate functions into video processors 20, 22, and 24 according to the number of bits per pixel. Alternatively video processors 20, 22, and 24 may be preloaded with appropriate functions for input video data of a pre-determined number of bits. First video processor 20 performs appropriate processing on the luminance video signal. For example, first video processor 20 may perform motion detection, sharpness, proscan, and vertical filtering. Alternatively, first video processor may only perform the proscan function on the luminance video signal. Second video processors 22 and 24 may perform additional processing to provide, for example, red, blue and green video signal outputs according to the number of bits per pixel.

If selecting circuitry 32 selects an input video signal having, for example, 8 bits per pixel, second video processor 22 may further process the luminance video signal output by first video processor 20 by, for example, performing the cubic scaling function. Demultiplexer 28 and multiplexer 26 provide the output of second video processor 22 to third video processor 24 according to a signal from selecting circuitry 32. Third video processor 24 may function to generate, for example, red, blue and green video signals using the color space conversion function.

Alternatively, if selecting circuitry 32 selects an input video signal having, for example, more than 8 bits per pixel, second video processor 22 may function to perform the proscan function on the input chrominance video signals. Additionally, second video processor 22 may generate, for example, a green output video signal from the output of first video processor 20 and the processed input chrominance video signals. Furthermore, multiplexer 26 may supply third video processor 24 with the output of first video processor 20 and the input chrominance video signals, U and V. Third video processor 24 may perform the proscan function on the chrominance video signals. Additionally, third video processor 24 may perform, for example, the color space conversion function to produce at least two of the red, blue, and green video signal outputs of system 14'.

Although the present invention has been described in detail, it should be understood that various changes, substitutions and alterations may be made hereto without departing from the spirit and scope of the invention as defined by the appended claims. For example, the specific processing performed by video processors 20, 22, and 24 may be varied without departing from the scope of the teachings of the present invention. Additionally, system 14' may comprise any other appropriate number of video processors to generate the desired output video signals.

What is claimed is:

1. A system for processing pixel data, each pixel having a selectable number of bits, said system comprising:

a first video processor for receiving and processing pixel data, wherein said pixel data is of a selectable number of bits, said number being dependent upon the dynamic range of said system, of a first input video signal, generating an output video signal;

a second video processor responsive to the output video signal of said first video processor and a second input video signal, said second video processor operable to process pixel data of said second input video signal and operable to generate one of a first, second and third output video signals; and a third video processor responsive to at least one of said first and second video processors, said third video processor operable to process said second input video signal and operable to generate at least two of said first, second and third output video signals.

2. The system of claim 1, and further comprising:

circuitry for selecting the number of bits per pixel; and circuitry responsive to said selecting circuitry for loading predetermined functions into said first, second and third video processors for processing said pixel data based on the selected number of bits.

3. The system of claim 1, wherein said first, second and third video processors each comprise a scan-line video processor.

4. The system of claim 1, wherein said first video processor generates a frame of output video signal for each field of said first input video signal.

5. The system of claim 1, wherein said second video processor generates a frame of output video signal for each field of said second input video signal.

6. The system of claim 1, wherein:

said first video processor is operable to generate a frame of output video signal for each field of said first input video signal; and said second video processor is operable to generate a frame of output video signal for each field of said second input video signal and is further operable to scale each frame of said first and second input video signals.

7. The system of claim 1, wherein said third video processor converts said processed first and second video signals into red, green and blue video signals using a color conversion function.

8. The system of claim 1, wherein:

said second video processor is operable to generate a frame of output video signal from each field of said second input video signal and is further operable to convert said processed first and second input video signals into a green video signal; and said third video processor is operable to generate a frame of output video signal from each field of said second input video signal and is further operable to convert said processed first and second input video signals into red and blue video signals.

9. A method for processing pixel data, said method comprising the steps of:

loading appropriate functions into a first, second and third video processor depending upon the number of bits selected for each pixel of data;

processing pixel data of a first input video signal in the first video processor and sending said processing pixel data to at least one of the second and third video processors;

processing pixel data of a second input video signal in at least one of the second and third video processors;

generating first, second and third video signal outputs using a color space conversion function in at least one of the second and third video processors.

10. The method of claim 9, wherein said step of processing pixel data of a first input video signal comprises the step of generating a frame of output luminance video signal for each field of input luminance video signal.

11. The method of claim 9, wherein said step of processing pixel data of a second input video signal comprises the step of generating a frame of output chrominance video signal for each field of input chrominance video signal.

12. A display system that receives video input for display on a spatial light modulator, comprising:

an analog to digital converter for converting an input video signal to pixel data, each pixel having a selectable number of bits;

a separator circuit for separating said input video signal into first and second input video signals;

a first video processor responsive to said separator circuit for receiving and processing pixel data of said first input video signal generating an output video signal;

a second video processor responsive to the output video signal of said first video processor and said separator circuit, said second video processor operable to process pixel data of said second input video signal and operable to generate one of a first, second and third output video signals;

a third video processor responsive to at least one of said first and second video processors, said third video processor operable to process said second input video signal and operable to generate at least two of said first, second and third output video signals;

a display memory responsive to at least one of said second and third video processors for receiving said first, second and third video signal outputs of pixel data and for formatting said pixel data into pit-planes of data; and a spatial light modulator for receiving said bit-planes of data and for providing an image corresponding to said bit-planes of data.

13. The system of claim 12 and further comprising: circuitry for selecting the number of bits per pixel; and circuitry responsive to said selecting circuitry for loading predetermined functions into said first, second and third video processors for processing said pixel data based on the selected number of bits.

14. The system of claim 12, wherein said first, second and third video processors each comprise a scan-line video processor.

15. The system of claim 12, wherein said first video processor generates a frame of output video signal for each field of said first input video signal.

16. The system of claim 12, wherein said second video processor generates a frame of output video signal for each field of said second input video signal.

17. The system of claim 12, wherein said first video processor is operable to generate a frame of output video signal for each field of said first input video signal; and said second video processor is operable to generate a frame of output video signal for each field of said second input video signal and is further operable to scale each frame of said first and second input video signals.

18. The system of claim 12, wherein said third video processor converts said processed first and second input video signals into red, green and blue video signals using a color conversion function.

19. The system of claim 12, wherein:

said second video processor is operable to generate a frame of output video signal from each field of said second input video signal and is further operable to convert said processed first and second input video signals into a green video signal; and said third video processor is operable to generate a frame of output video signal from each field of said second input video signal and is further operable to convert said processed first and second input video signals into red and blue video signals.

* * * * *